United States Patent [19]

Iwanicki

[11] 4,175,512
[45] Nov. 27, 1979

[54] ICE THICKNESS INDICATOR

[76] Inventor: Douglas W. Iwanicki, 120 Lynnfield St., Peabody, Mass. 01960

[21] Appl. No.: 930,751

[22] Filed: Aug. 3, 1978

[51] Int. Cl.² .................. G01D 11/00; G01K 11/06
[52] U.S. Cl. .................................. 116/217; 73/358
[58] Field of Search ............... 116/114.5, 101, 106, 116/217; 340/580, 581; 73/291, 358

[56] References Cited

U.S. PATENT DOCUMENTS

| | | | |
|---|---|---|---|
| 598,985 | 2/1898 | Fleming | 73/307 X |
| 1,320,610 | 11/1919 | Elia | 9/8 R |
| 2,788,282 | 4/1957 | Hammond, Jr. | 116/106 X |
| 2,819,476 | 1/1958 | Dodge | 9/8 R |
| 4,064,828 | 12/1977 | Clark | 116/114.5 |

FOREIGN PATENT DOCUMENTS 2224360 12/1973 Fed. Rep. of Germany ...... 116/114 Y

*Primary Examiner*—Daniel M. Yasich
*Attorney, Agent, or Firm*—Wolf, Greenfield & Sacks

[57] ABSTRACT

An ice thickness indicator is disposed at the surface of a body of water, as by floats, and provides a means to indicate whether the water has frozen to a predetermined thickness. The device includes an enclosed chamber which may be filled with water. The chamber is expansible by means of a movable member which partly defines the chamber. The movable member is located below the surface of the water and is connected to an upwardly extending indicator which displays different indications, depending on the relative position of the movable member. As the body of water in which the device is immersed freezes, the water within the expansible chamber also freezes and expands to cause movement of the movable member and operate the indicator means.

12 Claims, 8 Drawing Figures

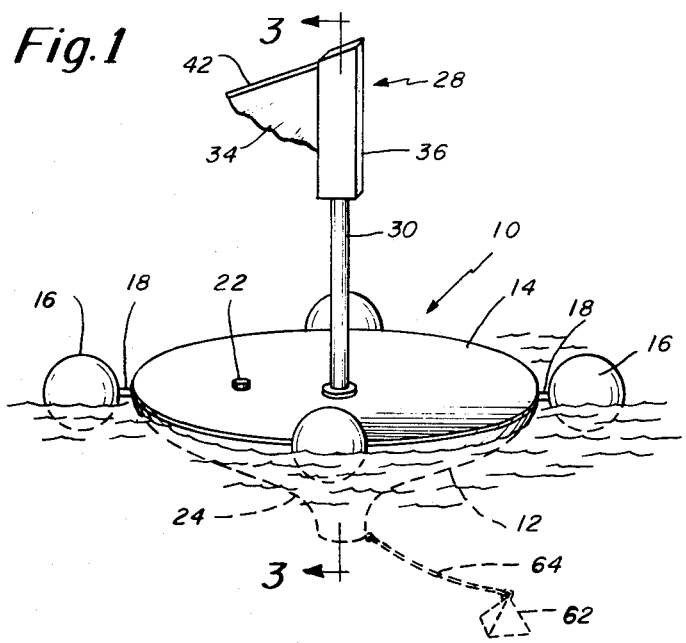
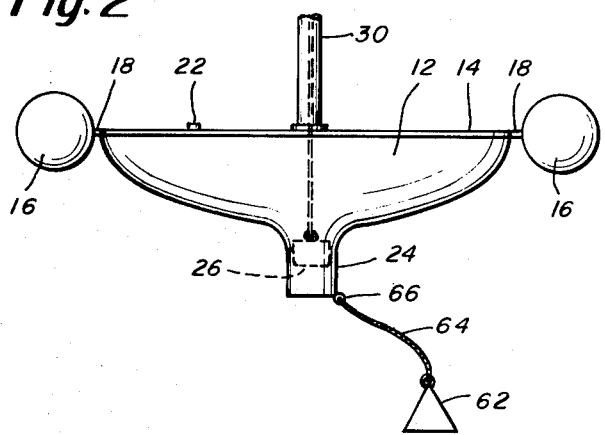
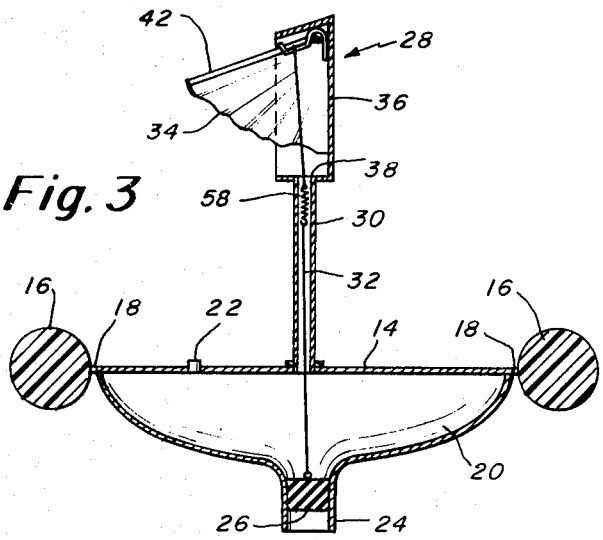
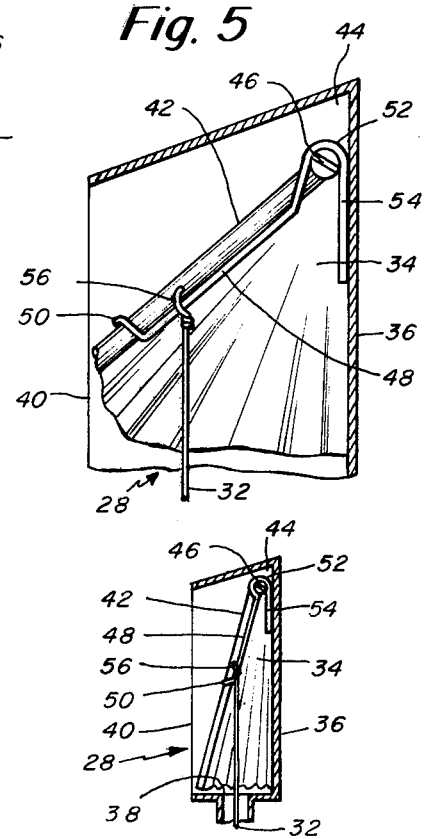
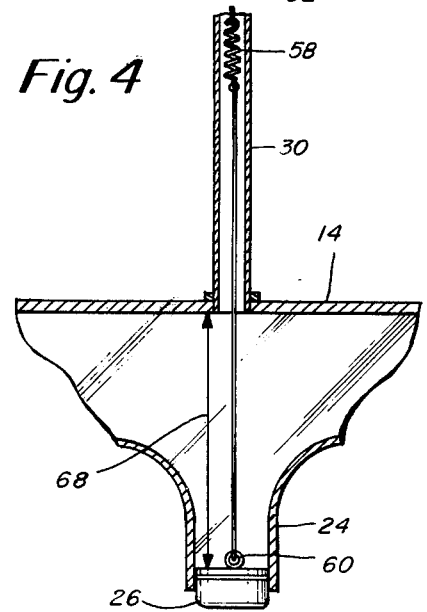

ICE THICKNESS INDICATOR

BACKGROUND AND SUMMARY OF THE INVENTION

This invention relates to a device for providing an indication of whether the surface of a body of water, such as a pond or like, has frozen to a predetermined thickness. For example, such a device is useful to warn skaters whether ice is of sufficient thickness so as to be safe for skating, walking or other activity on a frozen body of water. While it is contemplated that one of the primary uses of the invention will be as a safety warning device, it is to be understood that the invention is useable in any other environments where it is desirable to know whether ice has formed to a predetermined thickness. For example, in some instances it may be desirable to know whether the ice is capable of supporting a load of a heavy piece of machinery, vehicle or the like.

In brief, the invention includes a hollow housing which is supported at the surface of the body of water, for example, by floats. The housing defines a sealable chamber and has a portion which extends downwardly into the water. The downwardly extending portion of the chamber is constructed to be expandable and includes a movable member, such as a piston which is slideably received in a downwardly extending neck portion of the housing. When the device is placed into operation, the chamber is filled with water which will expand as it freezes to cause the movable member to move from its normal position. The housing carries an indicator device which extends upwardly from the housing so as to be visible from a distance. The indicator device is connected to the movable member and they are normally biased in a normal configuration in which the chamber and the movable member are in an unexpanded configuration and in which the indicator is in a "warning" configuration. As the body of water freezes, the water within the expansible chamber will freeze at the same rate and in the same manner so that the thickness of ice in the chamber will correspond to the thickness of ice in the surrounding body of water. As the water within the chamber freezes progressively in a downward direction, the expansion of the freezing water within the chamber urges the movable member downwardly to a position which will cause the indicator to change its signal, thus indicating that the ice is at least of that predetermined thickness.

It is among the general objects of the invention to provide a device which provides a discernable signal that the surface of a body of water has become frozen to a predetermined thickness.

Another object of the invention is to provide an ice thickness indicator of the type described which may be placed permanently in the water.

A further object of the invention is to provide an ice thickness indicator of the type described which is capable of providing a visual indication of the thickness of the ice from a distance.

Another object of the invention is to provide an ice thickness indicator of the type described which is of simple and comparatively inexpensive construction.

DESCRIPTION OF THE DRAWINGS

The foregoing and other objects and advantages of the invention will be appreciated more fully from the following further description thereof, with reference to the accompanying drawings wherein:

FIG. 1 is an overall illustration of the device in place in a body of water, with the signal flag being visible;

FIG. 2 is a fragmentary elevation of the device omitting the signal flag and associated parts;

FIG. 3 is a sectional view as seen along the line 3—3 of FIG 1, illustrating the signal flag as being partly withdrawn into the housing;

FIG. 4 is an enlarged sectional and partly broken illustration of the device, similar to FIG. 3 and illustrating the flag being fully withdrawn into the housing;

FIG. 5 is an enlarged sectional illustration of the flag and housing in the configuration shown in FIG. 3;

DESCRIPTION OF THE PREFERRED EMBODIMENT

Figure 6:
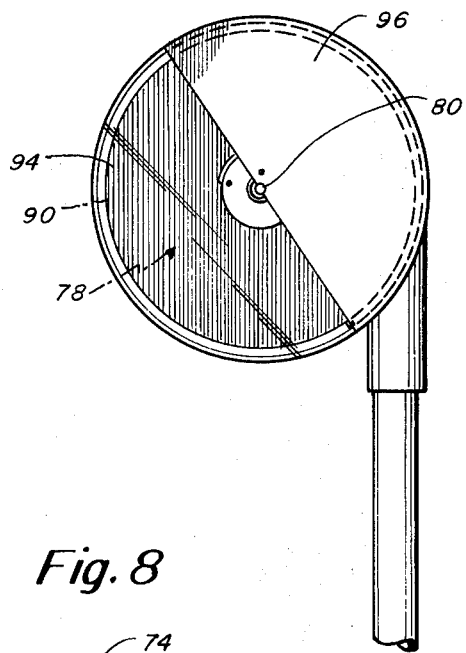
FIG. 6 is a side elevation of a modified form of indicator.

FIG. 1 illustrates the device floating on the surface of a body of water. The device includes a housing, indicated generally by the reference character 10. The housing 10 includes a main portion 12 and a cover 14 which is secured to the main portion 12. The main portion 12 and cover 14 may be formed from a variety of materials, such as an appropriate metal or plastic. Depending on the material from which the housing is made, it may be desirable to paint or coat the inner and outer surfaces of the housing so as to resist corrosion. The device is supported at the surface of the water by float means, which may include a plurality of floats 16. The floats are attached to the housing in a manner which will locate the cover 14 at the water surface, with the main portion 12 extending downwardly into the water, below the surface. In the illustrative embodiment, the floats 16 are secured to the edge of the cover 14 as by rods 18.

The main portion 12 and cover 14 define a hollow chamber 20 (FIG. 3) which is adapted to be filled with water. To this end, a resealable plug 22 may be disposed on the cover 14 to enable the chamber 20 to be filled with water and then resealed.

The main portion 12 of the housing 10 is generally bowl-shaped and extends downwardly and inwardly from the periphery of the cover 14. The central, bottom portion of the main portion 12 terminates in a downwardly extending tubular neck 24. A movable member, illustrated as a piston-like member 26 is slideably received within the neck 24 and is fitted to the internal surface of the neck 24 to effect a seal between the interior and exterior of the chamber 20. Thus, the chamber 20 is an expandable chamber whose volume can be varied, depending on the position of the piston 26 within the neck 24.

The piston 26 is connected to an indicator device, indicated generally by the reference character 28. The indicator device 28 is supported above the surface of the water by a hollow post 30 which is secured to and extends upwardly from the cover 14. The indicator device 28 is connected to the piston 26 by a cable 32 in a manner, described below, which causes the indicator device to respond to the position of the piston 26 within the neck 24, thereby providing an indication of whether the ice has frozen sufficiently to urge the piston 26 to its more downward position.

FIGS. 1 and 3 illustrate the configuration of the indicator device when it is in its warning position and in which the piston 26 is in its normal, relaxed position in which the water in the chamber 20 is not fully frozen and in which the chamber 20 has not been forced to expand to a volume corresponding to that of ice frozen within the chamber 20. In the embodiment illustrated in FIGS. 1-5, the warning indicator means consists of a flag 34 which is mounted within an indicator housing 36. The indicator housing 36, in turn, is mounted to the top of the post 30. As described below, the flag 34 is connected, through the cable 32, to the movable member 26.

The indicator housing 36 is formed to include an opening 38 at its bottom to enable the cable 32 to extend upwardly into the housing 36. The housing is provided with an opening 40 along one side to enable the flag 34 to move into and out of the housing during operation of the device. The flag 34, which may be triangular in shape and may be formed from suitable flexible sheet of plastic material, is attached along one edge to a rod 42 which may be formed from metal or other suitable, stiff material. The rod 42 is supported for pivotal movement within the upper rearward corner 44 of the housing 36, for pivotal movement about a transversely extending axis to enable the rod 42 to be pivoted between the retracted configuration illustrated in FIG. 4 and the extended, warning configuration illustrated in FIGS. 1 and 3. The pivot axis for the rod 42 may be defined by a transversely extending bolt 46 secured to the interior of the indicator housing 36. The flag is normally biased toward its extended configuration by a spring having one end 50 wrapped about the midportion of the rod 42. The spring extends rearwardly along the rod and is formed so that its midportion 52 loops about the bolt 46, with the other end 54 extending downwardly along the rear, adjacent wall of the indicator housing 36. The spring 48 is formed so that it will continually bias the rod 42 in its extended position.

The indicator flag is connected to an upper segment of the cable 32, as by passing the cable through a hole 56 in the rod 42. The upper portion of the cable 32 extends downwardly through the opening 38 and into the hollow post 30, where it is connected to a spring 58 which, in turn, is connected to the lower segment of the cable 32. The other end of the lower segment of the cable 32 is attached to the piston 26, as by an eyelet 60 or other appropriate means.

When the device is placed in operation, it is preferably moored by a weighted mooring 62 which is attached through a line 64 to a convenient portion of the device. For example, a small hole or eyelet, indicated at 66 may be located at the lowermost edge of the tubular neck 24. The plug 22 is removed, the chamber 20 is filled with water and the plug 22 is replaced to seal the chamber. It should be noted that the floats are selected and dimensioned so that the device, when filled with water, will float on the water with the cover 14 being disposed substantially at the surface at the body of water. When the device has been filled, it is simply permitted to float in the body of water. The spring 48 biases the flag device in its extended configuration and, in this regard, it should be noted that the spring 48 is of sufficient strength also to maintain the piston 26 in its raised position, at the more upper portion of the tubular neck 24. Also, it should be noted that the spring 58 is stiffer than the spring 48 so that the spring 58 will not be stretched appreciably during the normal range of operation of the device. Thus, the device will float in the body of water in its normal warning configuration. As the body of water begins to freeze at its surface, the upper portions of the water within the housing 20 similarly will freeze at substantially the same rate as the surrounding body of water. Thus, a layer of ice will form within the chamber 20 at the same rate and at the same thickness as the surrounding body of water. The ice within the chamber will form initially along the upper portion of the chamber, just below the cover 14 and will increase downwardly in thickness as does the ice formation of the surrounding body of water. As ice forms progressively within the chamber, causes an expansion of the volume of the enclosed ice-water volume which, in turn, urges the piston 26 downwardly through the neck 24. The downward motion of the piston 26 is transmitted through the cable 32 to the flag device to cause it to progressively retract into the indicator housing 36. When all of the water within the chamber 20 has frozen, the piston will have been advanced downwardly to an extent to cause the flag mechanism to retract completely within the housing 36, as indicated in FIG. 4.

Thus, when the thickness of the ice formed in the surrounding body of water is equal to the depth of ice formation within the chamber 20 (as measured from the inner surface of the cover 14 to the upper surface of the piston 26), the complete retraction of the flag indicates that the surrounding body of water has frozen to a thickness corresponding at least to the distance between the inner surface of the cover 14 and the upper surface of the piston 26, indicated by the dimension arrow 68 in FIG. 4. It will be appreciated, therefore, that the volume of the chamber 20, as well as the distance between the inner surface of the cover 14 and the upper and lower positions of the upper surface of the piston 26 may be selected to provide an indication of a predetermined ice thickness in the surrounding body of water.

Spring 58 provides assurance that the device will not be damaged in the event that piston 26 is caused to move downwardly beyond the position at which the flag is completely retracted. In the event that the piston 26 continues to travel somewhat beyond the completely retracted configuration of the flag, such additional travel will be permitted by the spring 58.

When the ice in the surrounding body of water begins to thaw, the device will progressively cause the indicator to extend toward its flag-projecting, warning configuration. In this regard, the surrounding body of ice will melt from its top surface (as from the sun's radiation or conduction from the warmer air). Similarly, the upper regions of the ice formed within the chamber will melt at substantially the same rate. As the upper portions of the ice within the chamber 20 melt, the remaining lower portion of the ice within the chamber 20 will tend to float upwardly toward and into engagement with the underside of the cover 14. This effectively raises the piston 26 and enables the spring 48 to move the flag toward its outer, warning configuration. In this regard, it should be noted that the inner surface of the main portion of the housing is concave and presents a smooth inner surface, free of any protrusions or members which might tend to catch on the ice and preclude the ice from floating to the upper regions of the chamber 20.

Figure 8:
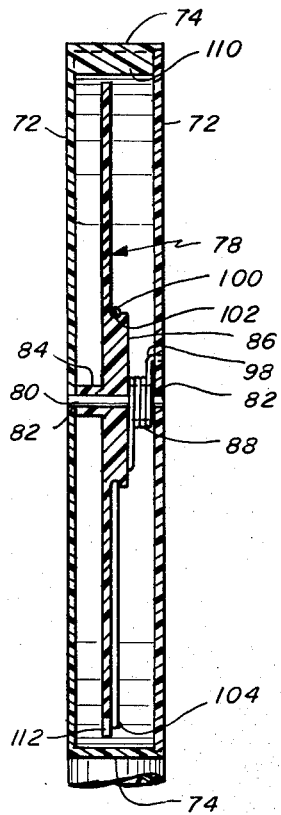
FIG. 8 is a sectional illustration of the indicator shown in FIGS. 6 and 7 as seen along the line 8—8 of FIG. 7.
Figure 7:
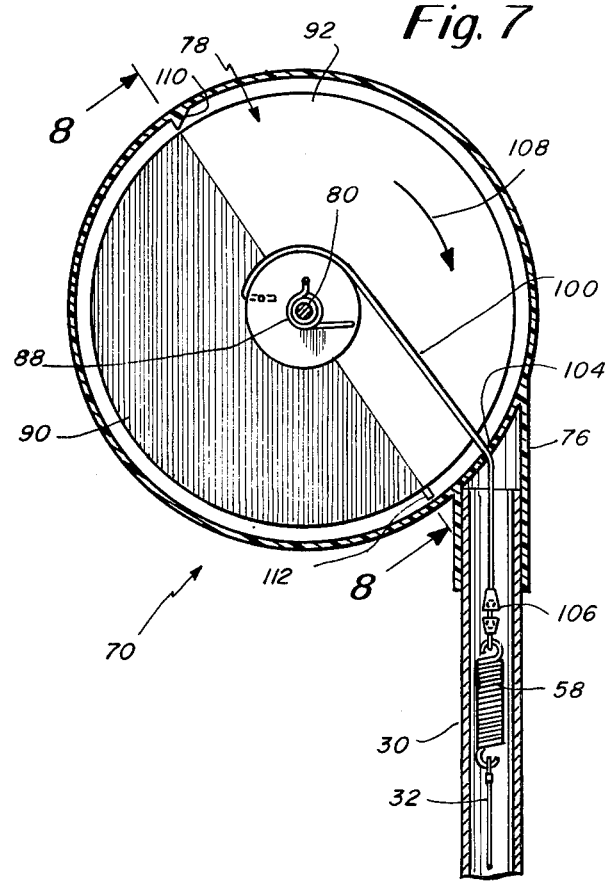
FIG. 7 is an enlarged illustration similar to FIG. 6 but in vertical section.

FIGS. 6–8 illustrate another embodiment of the invention which includes a modified indicator device, indicated generally by the reference character 70. In this embodiment, the indicator device is completely enclosed and is mounted on top of the post 30 so that it may rotate about the axis of the post to weathercock. This assures visibility of the indicator 70 from all locations and also minimizes the chance of the device being damaged by high winds. In addition, the indicator element is completely encased within the indicator device 70 to protect it from the elements. To these ends, the indicator device 70 includes a circular indicator housing having a pair of circular sidewalls 72 which are spaced by and secured to a surrounding peripheral wall 74. The device is mounted to the upper end of the post 30 by an integral sleeve 76 which extends generally tangentially from the peripheral wall 74 and which fits over the upper end of the post 30, as shown. Sleeve 76 and post 30 are dimensioned to enable the device 70 to rotate freely about the post 30 and with the circular body of the indicator device projecting radially from the post 30 to enable it to weathercock to present minimal resistance to wind. The sidewalls 72 preferably are formed from a material which is at least partly transparent, such as a suitable transparent plastic. Preferably, the peripheral wall 74 is formed from the same material and may be molded integrally with one of the sidewalls 72.

An indicator disc, indicated generally at 78 is rotatably mounted within the device 70 by a pin 80 whose ends are supported in centrally located holes 82 of the sidewalls 72. The disc 78 includes a central hub 84, and a circular boss portion 86 which extends from one side of the disc. A spring 88 is supported about one end of the hub 84 for purposes described below.

The indicator disc 78 includes a pair of semi-circular areas 90, 92, one of which (for example, the segment 90) is suitable colored (for example, red) to provide a visible warning indication. The other semi-circular segment 92 is transparent, or may be colored differently to provide a "safe" indication (for example, green). Alternatively, the semi-circular segment 92 may be omitted in whole or in part. The sidewalls 72 of the housing 70 are provided with a transparent semi-circular segment 94 and an opaque semi-circular segment 96. As illustrated in FIG. 6, when the disc 78 is in its "warning" configuration (illustrated in FIG. 6), the colored warning segment 90 of the disc 78 will be exposed through the transparent segment 94 of each of the sidewalls 72. Similarly, when the ice has formed to the predetermined thickness, the disc 78 will be rotated 180° (in a manner described below) which will rotate the warning segment 90 of the disc 78 into the opaque segments 96 of the sidewalls 72, thereby exposing the "safe" portions of the disc 78 through the transparent segments 94 of the housing sidewalls 72.

The spring 88 is affective to bias the disc in its "warning" position illustrated in FIG. 6. To this end, the spring 88 preferably is in the form of a coil wrapped about a portion of the hub 84. The spring 88 is provided with finger portions 98 which are secured by extending into a hole formed in the boss portions 86 of the disc 78 and a hole formed in the facing sidewalls 72 of the housing 70. The disc 78 is caused to rotate from its warning to its safe configuration by a cable segment 100 which is wrapped about a circumferential groove 102 formed about the boss 86. The cable segment 100 extends from the boss 86 downwardly and rearwardly and through an aperture 104 formed in the portion of the peripheral wall 74 which is adjacent the sleeve 76. The lower end of the cable segment 100 extends downwardly into the upper end of the post 30 and is attached, by a swivel connector 106 to the upper end of the spring 58 and, thence, to the upper end of the cable segment 32. Cable segment 32 and spring 58 serve the same function in this embodiment of the invention as in the previously described embodiment. The swivel joint 106 permits the entire indicator housing to swing freely about the upper end of the post 30.

Means are provided to limit the extent to which the disc 78 may rotate. One limit is controlled by the spring 88 which is relaxed when the disc 78 is in its warning configuration illustrated in FIG. 6. The extent to which the disc can be rotated during operation (in the direction indicated by the arrow 108) is limited by a stop 110 formed on the interior of the housing 70. For example, the stop 110 may be formed integrally with the peripheral wall and may extend radially inwardly as shown in FIGS. 7 and 8. A pin 112 is attached to the periphery of the disc 78 so that it will engage the stop 110 when the disc 78 has been rotated fully to its "safe" indicating position. In the event that the piston 26 tends to continue its downward movement, the spring 58 will expand to accommodate that movement.

Thus, I have described the preferred embodiments of my invention from which will be appreciated that it provides a simple means to determine whether the surface of a body of water has become frozen to a predetermined depth. It should be understood, however, that the foregoing description of the invention is intended merely to be illustrative thereof and that other embodiments and modifications may be apparent to those skilled in the art without departing from its spirit.

Having thus described the invention, what I desire to claim and secure by Letters Patent is:

1. A device for indicating whether the surface of a body of water has frozen to a predetermined thickness comprising:

a hollow housing adapted to be filled fully with water, said housing having a downwardly extending lower portion adapted to be submerged in the body of water and an opening formed in the downwardly extending lower portion;

a member carried by the housing and covering the opening in the downwardly extending lower portion in sealing relation to the housing, the member being movable with respect to the housing, to define an expansible chamber in cooperation with the housing, said movable member being movable toward and away from the more upwardly disposed portions of the housing;

means for supporting said housing so that predetermined portion thereof is disposed at reference surface said movable member is disposed at a predetermined depth below the surface of the body of water;

said movable member being movable downwardly in response to expansion of water within the housing as the water in the housing freezes;

indicator means carried by the housing at a location above the level of the housing; and means connecting the indicator means to said movable member to enable the indicator means to provide an indication of the position of the movable member and, thereby an indication of the thickness of the ice at the surface of the body of water.

2. A device as defined in claim 1 wherein the means for supporting said chamber comprises float means attached to the chamber.

3. A device as defined in claim 1 wherein said lower portion of the housing includes a tubular member which defines said opening;
said movable member comprising a piston slideably received within the tubular member.

4. A device as defined in claim 3 wherein the housing further comprises a dish-shaped member having said tubular portion extending downwardly from the center of the dish-shaped member.

5. A device as defined in claim 1 further comprising:
a hollow post attached to and extending upwardly from the housing, the indicator means being mounted to the upper end of the post;
said connecting means being connected to and extending from said movable member, upwardly through the housing and the post and being operatively connected to the indicator means.

6. A device as defined in claim 1 wherein the indicator means further comprises:
and an indicator housing;
an indicator element movably mounted within the indicator housing for movement between a first position in which the indicator element is visible and a second position in which the indicator element is concealed by at least a portion of the indicator housing; and
means biasing the indicator element toward said first position.

7. A device as defined in claim 6 further comprising:
said indicating element comprising a flag and flag supporting member mounted to the indicator housing for movement between said first and second positions;
the indicator housing having an opening formed to enable the flag to extend out of the indicator housing when in its first position and to enable the flag to be retracted into the indicator housing when in its second position.

8. A device as defined in claim 6 further comprising:
said indicator housing being enclosed and having at least a portion thereof which is transparent;
said indicator element being rotatably mounted within the indicator housing;
said indicator element having a portion thereof which is visible through the transparent portion of the indicator housing when the indicator element is in said first position and which is not visible through the transparent portion of the indicator housing when the indicator element is in the second position.

9. A device as defined in claim 6 further comprising:
said indicator housing being rotatably mounted on the upper end of the post for rotation about an axis which is disposed assymetrically of the housing thereby enabling the housing to weathercock under the influence of wind.

10. A device as defined in claim 9 wherein said indicator housing further comprises:
a hollow, generally circular indicator housing having a pair of spaced sidewalls and a peripheral wall connecting the sidewalls;
a tubular sleeve integral with the peripheral wall and extending generally tangentially therefrom, said sleeve being rotatably disposed on the upper end of the post;
said indicator element comprising a disc rotatably mounted within the indicator housing, said disc having a visually distinguishable portion;
the sidewalls of the indicator housing having transparent portions, the visually distinguishable portion of the disc being registerable with the transparent portions of the indicator housing sidewalls;
stop limit means associated with the housing and the disc for precluding the disc from rotating beyond said second position thereof.

11. A device as defined in claim 1 wherein the means connecting the indicator means to the movable member comprises a cable, said cable having a lost motion element interposed between its ends.

12. A device as defined in claim 11 wherein the lost motion element comprises an expansion spring.

* * * * *

UNITED STATES PATENT OFFICE
CERTIFICATE OF CORRECTION

Patent No. 4,175,512          Dated November 27, 1979

Inventor(s) Douglas W. Iwanicki

It is certified that error appears in the above-identified patent and that said Letters Patent are hereby corrected as shown below:

1. A device for indicating whether the surface of a body of water has frozen to a predetermined thickness comprising:

a hollow housing adapted to be filled fully with water, said housing having a downwardly extending lower portion adapted to be submerged in the body of water and an opening formed in the downwardly extending lower portion;

a member carried by the housing and covering the opening in the downwardly extending lower portion in sealing relation to the housing, the member being movable with respect to the housing, to define an expansible chamber in cooperation with the housing, said movable member being movable toward and away from the more upwardly disposed portions of the housing;

means for supporting said housing so that said movable member is disposed at a predetermined depth below the surface of the body of water;

said movable member being movable downwardly in response to expansion of water within the housing as the water in the housing freezes;

UNITED STATES PATENT OFFICE
CERTIFICATE OF CORRECTION

Patent No. 4,175,512   Dated November 27, 1979

Inventor(s) Douglas W. Iwanicki

It is certified that error appears in the above-identified patent and that said Letters Patent are hereby corrected as shown below:

indicator means carried by the housing at a location above the level of the housing; and means connecting the indicator means to said movable member to enable the indicator means to provide an indication of the position of the movable member and, thereby an indication of the thickness of the ice at the surface of the body of water.

Signed and Sealed this

Eighteenth Day of March 1980

[SEAL]

Attest:

SIDNEY A. DIAMOND

Attesting Officer     Commissioner of Patents and Trademarks